July 26, 1932.  E. R. MARBACH ET AL  1,869,267
METHOD OF MAKING STEERING WHEEL INSERTS
Filed Sept. 5, 1930   3 Sheets-Sheet 1
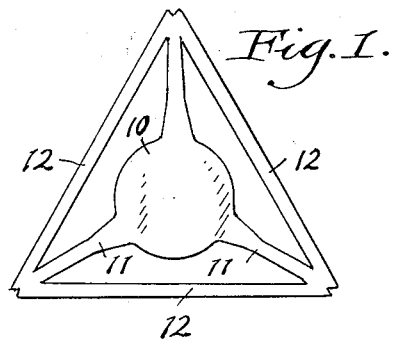
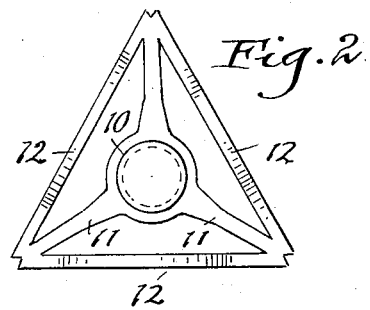
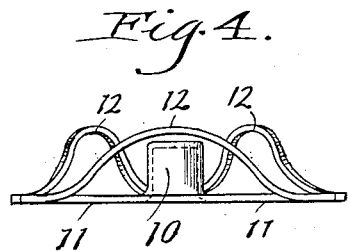
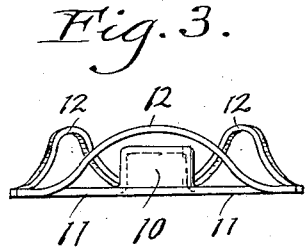
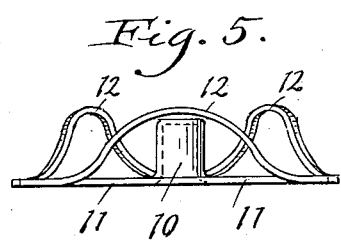
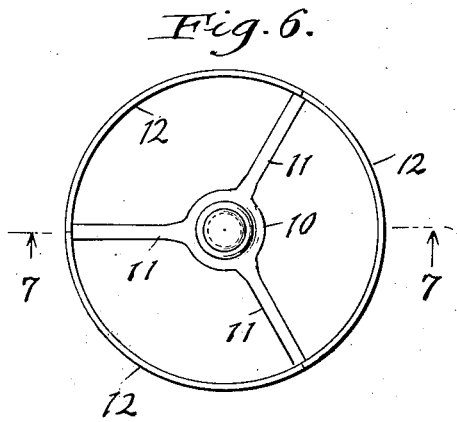
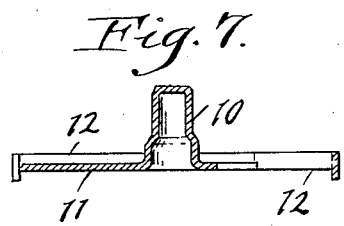
Inventors
Edward R. Marbach
Gerald F. Cavanagh
By Kwis Hudson & Kent
Attorneys July 26, 1932. E. R. MARBACH ET AL 1,869,267
METHOD OF MAKING STEERING WHEEL INSERTS
Filed Sept. 5, 1930 3 Sheets-Sheet 3

Inventors
Edward R. Marbach
Gerald F. Cavanagh
Kivis Hudson & Kent
Attorneys

Patented July 26, 1932

1,869,267

UNITED STATES PATENT OFFICE

EDWARD R. MARBACH AND GERALD F. CAVANAGH, OF CLEVELAND, OHIO, ASSIGNORS TO THE OHIO RUBBER COMPANY, OF CLEVELAND, OHIO, A CORPORATION OF OHIO

METHOD OF MAKING STEERING WHEEL INSERTS

Application filed September 5, 1930. Serial No. 479,902.

This invention relates to steering wheels, of the type comprising an insert constructed of sheet metal of as few parts as possible, preferably comprising one integral piece, and generally covered with rubber or other non-metallic composition.

It is an object of the present invention to construct the sheet metal insert from a flat integral sheet metal blank with a minimum amount of scrap.

Another object is to construct the insert from a blank having substantially straight rim portions, and to draw in the ends of the rim portions so that they may be formed into a continuous circular rim.

Another object of the invention is to provide an improved way of increasing the thickness of the hub portion so that the same may receive a keyway and have adequate strength for engagement with the steering shaft.

Another object of the invention is to economize and improve the manufacture of the sheet metal insert.

Other objects and features of novelty will be apparent as the following description proceeds, reference being had to the accompanying drawings in which Figure 1 is a plan view of a flat sheet metal blank from which the steering wheel insert is formed according to the present invention.

Fig. 2 is a plan view of the blank showing the hub portion cupped, and the spoke portions drawn inwardly thereby.

Fig. 3 is an elevation of the structure shown in Fig. 2, showing the buckling of the rim portions due to cupping of the hub portion.

Fig. 4 is a view similar to Fig. 3 showing further cupping.

Fig. 5 is similar to Fig. 4, showing further contraction and elongation of the hub portion.

Fig. 6 is a plan view of the inverted insert, showing the rim portions formed into a continuous rim.

Fig. 7 is a section along the line 7—7 of Fig. 6.

Figure 8:
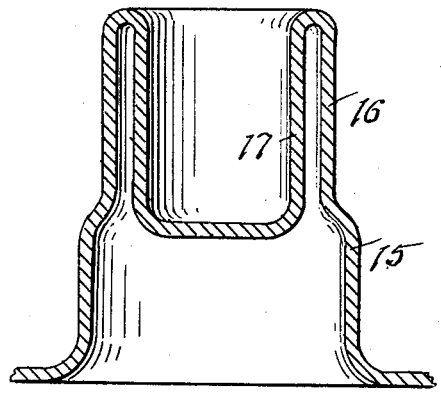
Fig. 8 is an enlarged detailed section, showing the step of increasing the thickness of the hub portion.

Referring more particularly to the drawings, the sheet metal blank shown in Fig. 1 is triangular, and comprises a circular hub portion 10, spoke portions 11 extending radially therefrom, and substantially straight rim portions 12 extending between the ends adjacent spoke portions 11. The rim portions 12 are preferably integral at each end with the ends of the respective spoke portions 11. While the triangular form is preferred, the same is not absolutely essential, other polygonal forms being contemplated. Furthermore the rim portions 12 need not be absolutely straight, so long as they lie substantially within the confines of a polygon determined by the extreme ends of the spoke portions.

The hub portion 10, spokes 11 and rim portions 12 are all integral, and respectively integral with each other. For this reason a polygonal, preferably triangular, piece of sheet metal may be formed into a blank such as shown in Fig. 1, by merely cutting away the metal between a marginal strip comprising the rim portions 12 and the boundary of the spider comprising the hub portion 10 and the spokes 11. Thus while the present method contemplates some scrap or waste metal, the same is more than compensated for by the correspondingly greater reduction in labor costs in the production of the insert.

In operating upon the blank as described, to form the same into a steering wheel insert, the hub portion 10 is cupped, as for example by drawing the same between dies which will draw the rim thereof inwardly. The spoke portions 11, being integral with the hub portion 10, will be drawn inwardly as shown in Fig. 2, and at the same time the outer ends of the spokes will also move inwardly, there being no stretching of the metal of the spoke portions 11 contemplated in the present method. This drawing inward of the spoke portions 11 will cause the rim portions 12 to buckle as shown in Figs. 3, 4 and 5.

In case of a wheel having more than three spokes, it will be necessary to draw the metal for the hub section part way in, before piercing the holes which define the spokes.

The cupping of the hub may be in one step, to bring the blank from the form shown in Fig. 1 to the form shown in Fig. 5, but it has been found very satisfactory to accomplish this in three steps, resulting in the intermediate stages shown in Figs. 3 and 4. This arrangement permits the cupping to be carried out by drawing the hub portion 10 through a series of dies of successively smaller diameter, this die formation preserving the grain of the metal, as well as uniform thickness and strength.

The cupping of the hub portion, and the drawing in of the spoke portions, as well as the buckling of the rim portions, are necessarily simultaneous and dependent steps. However, the finish of the hub portion and the finish of the continuous rim are independent as to time or sequence. Thus although the finish of the hub will be herein described before the finish of the completed rim, it is to be understood that this sequence is not essential.

From the form shown in Fig. 5 the hub portion 10 is further contracted to the forms shown in Figs. 6 and 7, preferably by drawing the same through dies of further decreased diameter. The hub is then brought into the form shown in Fig. 8, the hub portion 10 now comprising a cup portion 15, an outer hub 16 and an inwardly or reentrant hub 17. Comparing Figs. 7 and 8, it will be noted that the bottom of the hub portion is forced inwardly to form the reentrant portion 17. From the form shown in Fig. 8 the hub is brought into the form shown in Fig. 9 by pressing, rolling or spinning, so as to contract the outer hub portion 16 and bring it closer to the inner portion 17. This operation is continued, preferably by another step, to bring the blank from the form shown in Fig. 9 to the form shown in Fig. 10 in which the outer portion 16 is tightly contracted about the inner portion 17 which has also been decreased in diameter and consequently elongated. This completes the hub, with the exception of the cutting of a keyway which is preferably broached into the inner hub 17, and the bottom of the cup portion is preferably punched or otherwise cut out so that the inner bore of the portion 17 extends into and communicates with the cup portion 15.

Figure 9:
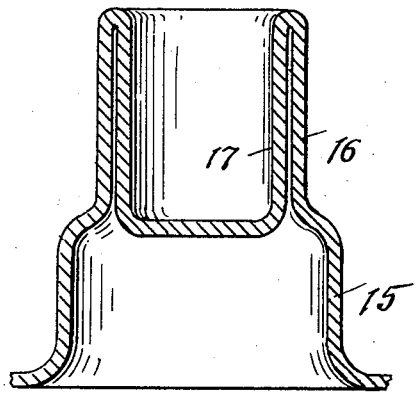
Fig. 9 is a view similar to Fig. 8 showing the same as contracted to decrease the hub diameter.
Figure 10:
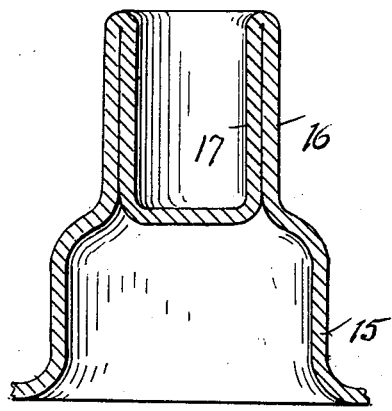
Fig. 10 is similar to Fig. 9, showing further contraction of the hub.
Figure 11:
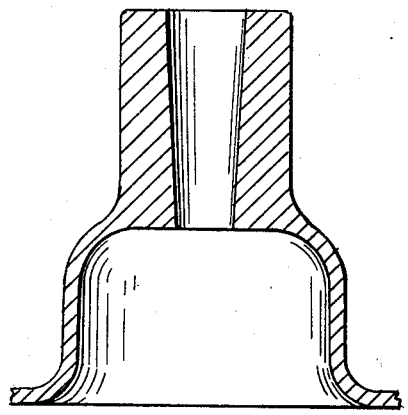
Fig. 11 is a view similar to Fig. 10, but showing a modified method of thickening the hub.

In lieu of the operations of Figs. 8, 9 and 10, the hub may be upset, as shown in Fig. 11, to effect the desired thickening of the hub.

Figure 12:
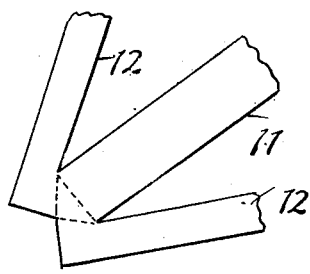
Fig. 12 is a detail plan of the end of one of the spoke portions, showing in dotted lines the lines of folding necessary to form the rim portions into a continuous rim.
Figure 13:
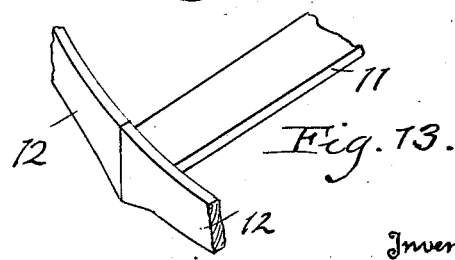
Fig. 13 is a perspective view of the parts shown in Fig. 12 after the same have been folded as described.

The operations upon the rim portions 12 to form the same into a continuous band are shown in detail in Figs. 12 and 13. It will be borne in mind that the rim portions 12 are buckled as shown in Figs. 3, 4 and 5. Thus when the metal is folded along the dotted lines shown in Fig. 12, the ends of the rim portions 12 will abut and form a continuous rim concentric with the hub. The triangular area defined by the dotted lines will be folded downwardly, so as not to interfere with the desired shape of the completed wheel, and this area will preserve the desired integral relation and continuity between the spoke portions 11 and rim portions 12.

As shown in Fig. 13, the completed rim is substantially cylindrical, in that it is folded transversely with respect to the spoke portion 11. However, the rim may be variously operated upon and given any desired cross section before the application of the finish covering. Thus the rim may be rolled into a tube, flattened into an annulus, or corrugated either in the cylindrical or the flattened form, to give it greater inherent strength and stiffness.

Figure 14:
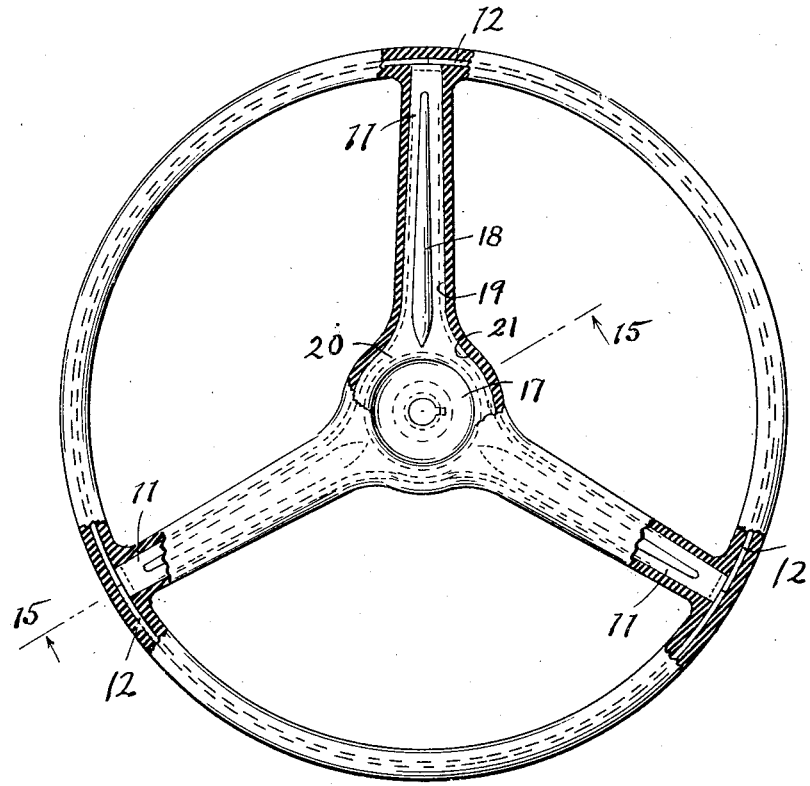
Fig. 14 is a plan view of the completed steering wheel insert, after application of the rubber or other composition.

As shown in Fig. 14, the spoke portions are provided with central longitudinal depressions 18 and the margins thereof are turned down as at 19 forming strengthening flanges. The method described leaves an annular flange 20 about the cup portion 17 and the flange 19, preferably continued as at 21 along the annular flange 20 so that the flange 19 of one spoke is continued into the corresponding flange of the adjacent spokes.

Figure 15:
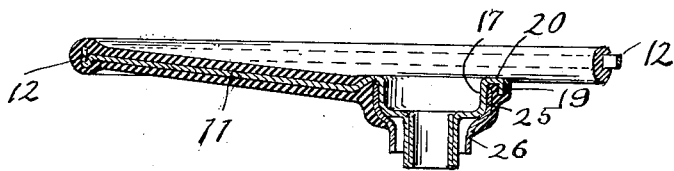
Fig. 15 is a section along the line 15—15 of Fig. 14.

As shown in Fig. 15, a collar 25 is placed over the cup portion 17 at the under side thereof, and is provided with a depending annular flange 26, the purpose of which is to overlie the upper end of the steering mast and form a skirt therefor. This separate element is merely for the purpose described which is for a decorative or design function, so that the insert proper, from a practical standpoint, is really one integral piece.

While embodiments of the invention have been illustrated and described in such detail as to enable any one skilled in the art to practice the invention, nevertheless it is to be understood that the invention is not to be limited to the details disclosed, other than as necessitated by the development of the prior art; but instead, the invention embraces such embodiments of the broad idea as fall within the scope of the appended claims, it being obvious that various changes may be made in the disclosed embodiment without departing from the spirit of the invention.

Having thus described our invention, we claim:

1. In a method of forming a steering wheel insert, the steps comprising forming a sheet metal blank having spoke portions and rim portions, and drawing said spoke portions inwardly of said rim portions.

2. In a method of forming a steering wheel insert, the steps comprising forming a sheet metal blank having a hub portion with spoke portions projecting therefrom, cupping the hub portion, and thereby drawing the spoke portions inwardly.

3. In a method of forming a steering wheel insert, the steps comprising forming a sheet metal blank having spoke portions and rim portions lying substantially within a polygon having corners at the ends of the spoke portions, and drawing the spoke portions inwardly to buckle said rim portions to permit the same to be formed into a circular rim.

4. In a method of forming a steering wheel insert, the steps comprising forming a sheet metal blank having a hub portion, spoke portions extending therefrom, and rim portions integral with the ends of the spoke portions, cupping the hub portion and thereby drawing the spoke portions inwardly, whereby the relative length of said rim portions is increased.

5. The method of forming a steering wheel insert, which comprises cutting out equal symmetrical internal areas of a polygonal blank between the margin and the center thereof and centered with respect to the sides of the blank, cupping the central portion of the blank, and curving the margin of said blank to form a rim portion.

6. The method of forming the rim of a steering wheel insert, which comprises drawing inwardly the corners of a polygonal sheet metal strip and curving the strips to form the same into a continuous circular band.

7. In a method of forming a steering wheel insert, the steps comprising forming a sheet metal blank having a hub portion, spoke portions integral therewith, and rim portions integral with the ends of the spoke portions, cupping the hub portion to contract and elongate the same, and forcing the end of said hub portion back within itself to thereby thicken the same.

8. A sheet metal blank for a steering wheel insert comprising a spider and a non-circular rim integral therewith.

9. A sheet metal blank for a steering wheel insert, comprising a hub portion, spoke portions and substantially straight rim portions extending between said spoke portions.

10. A sheet metal blank for a steering wheel insert, comprising a central hub portion, spoke portions extending therefrom, and substantially straight rim portions having both ends respectively integral with the ends of the spoke portions.

11. A sheet metal blank for a steering wheel insert, said blank including a marginal polygonal band.

12. A sheet metal blank for a steering wheel insert, comprising spoke portions and substantially straight rim portions having both ends respectively integral with the ends of the spoke portions.

13. A sheet metal blank for a steering wheel insert, comprising a central disk, spoke portions integral therewith and radiating therefrom, and a continuous polygonal strip having the corners thereof integral with the ends of the spoke portions.

14. A sheet metal blank for a steering wheel insert, comprising a hub portion, spoke portions, and rim portions connecting the outer ends of the spoke portions and lying within a polygon having corners at the ends of said spoke portions.

15. A sheet metal blank for a steering wheel comprising a hub portion having spoke portions projecting therefrom, the ends of the spoke portions projecting beyond the circumference of the wheel to be formed, and rim portions extending between the ends of said spoke portions and lying substantially within a polygon having the corners thereof at the ends of the spoke portions.

In testimony whereof, we hereunto affix our signatures.

EDWARD R. MARBACH.
GERALD F. CAVANAGH.